(12) United States Patent
Houzvicka et al.

(10) Patent No.: US 11,885,919 B2
(45) Date of Patent: Jan. 30, 2024

(54) CALORIMETRIC DETECTOR FOR MEASURING THE ENERGY OF ELECTRONS AND PHOTONS

(71) Applicant: CRYTUR, spol. s r.o., Turnov (CZ)

(72) Inventors: Jindrich Houzvicka, Turnov (CZ); Silvia Sykorova, Praha-Vychod (CZ); Patrik Hradecky, Jicin (CZ)

(73) Assignee: CRYTUR, spol. s r.o., Turnov (CZ)

( * ) Notice: Subject to any disclaimer, the term of this patent is extended or adjusted under 35 U.S.C. 154(b) by 95 days.

(21) Appl. No.: 17/713,393

(22) Filed: Apr. 5, 2022

(65) Prior Publication Data

US 2022/0326398 A1 Oct. 13, 2022

Related U.S. Application Data

(60) Provisional application No. 63/172,139, filed on Apr. 8, 2021.

(51) Int. Cl.
*G01T 1/20* (2006.01)
*G01T 1/202* (2006.01)

(52) U.S. Cl.
CPC ............ *G01T 1/201* (2013.01); *G01T 1/2023* (2013.01)

(58) Field of Classification Search
CPC .............................. G01T 1/201; G01T 1/2023
See application file for complete search history.

(56) References Cited

U.S. PATENT DOCUMENTS 4,891,522 A * 1/1990 Coon ...................... G01T 1/243
250/394

OTHER PUBLICATIONS

R. McNabb et al. A Tungsten / Scintillating Fiber Electromagnetic Calorimeter Prototype for a High-Rate Muon (g-2) Experiment, Department of Physics, University of Illinois at Urbana-Champaign, Urbana, IL, USA, Department of Physics, Boston University, Boston, MA , US, arXiv:0910.0818v1 Oct. 5, 2009 (Year: 2009).*
Livan, M., Wigmans, R., Scintillating-Fibre Calorimetry, European Organization for Nuclear Research, Cern 95-02, Feb. 28, 1995.
Adinolfi, M. et al., The KLOE electromagnetic calorimeter, Nuclear Instruments & Methods in Physics Research, Section A, 482, 2002, 364-386.

(Continued)

*Primary Examiner* — Hugh Maupin
(74) *Attorney, Agent, or Firm* — Mark M. Friedman

(57) ABSTRACT

A calorimetric detector (1) for measuring energy of electrons and photons comprises a light energy absorber and scintillating fibers (2). The absorber is formed of a tungsten matrix (3), comprising a first assembly (4) and a second assembly (5) of parallel tungsten plates. The first assembly (4) is perpendicular to the second assembly (5) forming a grid, while each plate is in one half formed by alternating teeth (6) and gaps (7). The first assembly's (4) plates fit detachably with their teeth (6) into the gaps (7) of the second assembly (5) and vice versa. Spaces between the plates of the first assembly (4) and the second assembly (5) form longitudinal sections (8) with inner cross-section size of one pixel. The scintillating fibers (2) are longitudinally arranged, made of a single crystal material. The tungsten matrix (3) is in a protective metal frame (9) having tungsten inner walls (10).

9 Claims, 5 Drawing Sheets

(56) References Cited

OTHER PUBLICATIONS

Martinazzoli, L., Crystal Fibers for the LHCb Calorimeter Upgrade, IEEE Transactions on Nuclear Science, vol. 67, No. 6, Jun. 2020.
Shmanin, E., GEANT4 simulation of energy resolution of the SPACAL electromagnetic calorimeter, Journal of Physics: Conference Series, 1439 (2020( 012007, doi:10.1088/1742-6596/1439/1/012007.
Adriani, O. et al., The CALOCUBE project for a space based cosmic ray experiment: design, construction, and first performance of a high granularity calorimeter prototype., JINST, [physics.ins-det] Oct. 22, 2019.

* cited by examiner

CALORIMETRIC DETECTOR FOR MEASURING THE ENERGY OF ELECTRONS AND PHOTONS

FIELD OF THE INVENTION

The present invention generally concerns scintillator materials in nuclear or high energy physics in calorimetry for measuring energy deposition. The present invention mainly concerns a calorimetric detector for measuring the energy of electrons and photons, which uses those scintillator materials.

BACKGROUND OF THE INVENTION

A calorimeter is an experimental apparatus for measuring the energy of particles. The essential parts of the calorimeter are namely a source, a detector, a face cover, a reflector and a readout electronics. The detector furthermore comprises an absorber and scintillating fibers. Particles enter the calorimeter and initiate a particle shower energy while the particles' energy is deposited in the calorimeter, collected, and measured. Calorimeters are segmented transversely to provide information about the direction of the particle, energy deposited and longitudinal segmentation can provide information about the identity of the particle based on the shape of the shower energy as it develops.

The term "shower energy, shower" for the purpose of this invention are defined as a cascade of secondary particles produces as the result of a high-energy particle interacting with dense matter. The incoming particle interacts, producing multiple new particles with lesser energy, each of these then interacts, in the same way, a process that continues until many thousands, millions, or even billions of low-energy particles are produced.

Signals determining the energy of particles are mainly produced in the form of scintillation or Cerenkov light generated by particles traversing the scintillating fibers. The first applications of scintillating fibers as particle detectors were mainly as devices for tracking charged particles. The excellent spatial accuracy, the fast signals, the compact construction, and the reliable operation of these detectors were quickly recognized as important features and several major experiments successfully employed fiber tracking devices in their set-up, furthermore it led to the application of scintillating fibers as active elements in sampling calorimeters. For calorimeter application the fiber information is used differently than in the tracking applications, the number of scintillation photons is a measure of shower energy.

Calorimeters are commonly made in spaghetti/shaslik structures and those structures were used in the past in many high energy physics experiments. As described in M. Livan, V. Vercesi and R. Wigmans, Scintillating—Fibre calorimetry, CERN 95-02 article the DELPHI and JETSET detectors were intended for the detection of electromagnetic showers, initiated project spaghetti calorimeter. Another example described there is KLOE detector, which uses an electromagnetic calorimeter based on lead-scintillating fiber. The fibers provide good light transmission over the required distances, approximately up to 4.3 m. Superior timing accuracy is obtained because of single mode propagation. KLOE detector consists of 24 modules, where all modules are stacks of around 200 grooved, 0.5 mm thick, lead foils alternating with 200 layers of cladded 1 mm diameter scintillating fibers, glued together with a special epoxy, which is not harmful to the fiber plastic. Fibers are mostly orthogonal to the entering particles in order to avoid channeling. There are three basic steps for building the stack: a precise amount of glue is spread over the lead foil; fibers are laid down and if needed manually fitted into the grooves and a new lead foil is laid down in place. This is described in an article by M. Adinolfi, F. Ambrosino, A. Antonelli, et al., The KLOE electromagnetic calorimeter, Nuc. Inst. and Meth. in Phys. Res., p. 364-386, 2002.

Another type of detector is spaghetti or spacal detector built using pile-up technique, as described in an article M. Livan, V. Vercesi and R. Wigmans, Scintillating—Fibre calorimetry, CERN 95-02. The detector is subdivided in hexagonal towers, 86 mm apex-to-apex and each tower contains 1141 fibers equidistant from other towers. The fiber spacing is 2.22 mm center-to-center. Another spacal detector consists of a central tower surrounded by seven concentric hexagonal rings, with outer ring incomplete. The detector has roughly a cylindrical shape and therefore almost fully contains hadronic showers.

Due to high radiation hardness limitations, more and more restrictions are applied to the calorimeter design. The new generation of detector has to stand radiation doses on the level of MGy comparing with the past when the detectors were design for kGy doses. For example, in the past plastic scintillating plates were used as scintillation material, wavelength shifting materials used to absorb light at one wavelength and re-emit the light isotopically at longer wavelengths to provide useful modes of light collection. Those types are no longer used since they are not radiant enough.

The object of the invention is to prepare a calorimetric detector for measuring the energy of electrons and photons that would have flexible design and could be optimized in accordance with the type of particle and shower which needs to be detected, furthermore the calorimetric detector would allow define the cells of the calorimetric detector based on the type of the particle. Another object of the invention is to prepare a calorimetric detector for measuring the energy of electrons and photons that would consist of an absorber with high density to absorb all energy while scintillating fibers would be built in a structure so that it would not have to be glued with epoxy glue.

SUMMARY OF THE INVENTION

This object is achieved by development of a calorimetric detector for measuring the energy of electrons and photons according to this invention. The calorimetric detector namely comprises of a light energy absorber and scintillating fibers. It is the subject matter of the invention that the absorber is formed of a tungsten matrix. The tungsten matrix has in preferred embodiment size of at least 9×9 pixels. Whereas the tungsten matrix comprises a first assembly of parallel tungsten plates and a second assembly of parallel tungsten plates. Wherein the first assembly is perpendicular to the second assembly and forms with it a grid such that each plate is in one half formed by alternating teeth and gaps. The plates of the first assembly fit detachably with their teeth into the gaps of the second assembly and vice versa, so that the spaces between the plates of the first assembly and the second assembly form longitudinal sections of the tungsten matrix. The inner cross-section of the longitudinal sections has a size of one pixel in which the scintillating fibers are arranged longitudinally, further that the scintillating fibers are made of a single crystal material selected from the group: YAG:Ce or GGAG:Ce or LYSO:Ce. The tungsten matrix is arranged in a protective metal frame having tungsten inner walls forming a tungsten matrix shell. This arrangement of the calorimetric detector for measuring the energy of electrons and photons provides absorber with high density, which is provided by tungsten with density 19 g/cm³ that is sufficient for absorbing all energy. Furthermore, it provides a detector that has flexible design and is optimized in accordance with the type of particle and shower which needs to be detected. The calorimetric detector also consists of an absorber with high density to absorb all energy while scintillating fibers are built in a structure so that it does not have to be glued with epoxy glue.

In a preferred embodiment, the protective metal frame and the tungsten matrix are in prismatic shape. This arrangement is essential to provide a calorimetric detector with longitudinal sections of equal size in every part of the calorimetric detector. Also, this arrangement allows to define the cells of the calorimetric detector based on the type of the particle.

In another preferred embodiment, the longitudinal sections adjacent to the inner side of the tungsten matrix shell also have an inner cross-section of 1 pixel. This is essential for providing enhanced absorption of the energy by tungsten matrix.

In another preferred embodiment, the plates of the first assembly and the second assembly are made of pickled tungsten sheet and the plates of the first assembly and the second assembly have a thickness in the range of 0.39 to 0.61 mm. Such a thickness provides essential ratio of active surface compared to the size of the tungsten matrix.

In another preferred embodiment, the protective metal frame is made of stainless steel. This arrangement provides a sufficient shield that compared to other protective metal frames provides less thicker arrangement so that the calorimetric detector can be smaller size and used in calorimeters multiple sizes.

In another preferred embodiment, the protective metal frame is further provided with a face cover, a reflector, a readout electronics and/or a combination thereof.

In another preferred embodiment, the length of the calorimetric detector is equal to the length of the first assembly of parallel tungsten plates and the second assembly of parallel tungsten plates. This arrangement is needed to provide a detector of a small size with sufficient size of the absorber and minimum size of the protective metal frame.

The advantage of the calorimetric detector for measuring the energy of electrons and photons is that the calorimetric detector is designed and optimized in accordance with the type of particle and shower which needs to be detected. Furthermore, the calorimetric detector allows to define its cells based on the type of the particle. Another advantage of the calorimetric detector for measuring the energy of electrons and photons is that it consists of an absorber with high density to absorb all energy while scintillating fibers are built in the structure and not glued with epoxy glue.

BRIEF DESCRIPTION OF THE DRAWINGS

The present invention will be explained in detail by means of the following figures where.

DESCRIPTION OF THE PREFERRED EMBODIMENTS

This invention proposes a calorimetric detector 1 comprising pure tungsten matrix 3 combined with single crystal fibers as scintillating fibers 2, where the scintillating fibers 2 were used to collect and transport the light. The nature of the design was flexible and it was optimized in accordance with the type of particle and shower which needed to be detected.

The shower length of the particles was estimated via simulation and it was described mainly by two parameters, as Moliere radius and the radiation length $X_0$ are. A measurement of the transverse size, integrated over the full shower depth was given by the Molire radius ($R_M$) which was approximated by $R_M(g/cm^2)$ by the following equation:

$$R_M\left(\frac{g}{cm^2}\right) \cong 21 \text{ MeV} \frac{X_0}{\in (\text{MeV})}.$$

Figure 1:
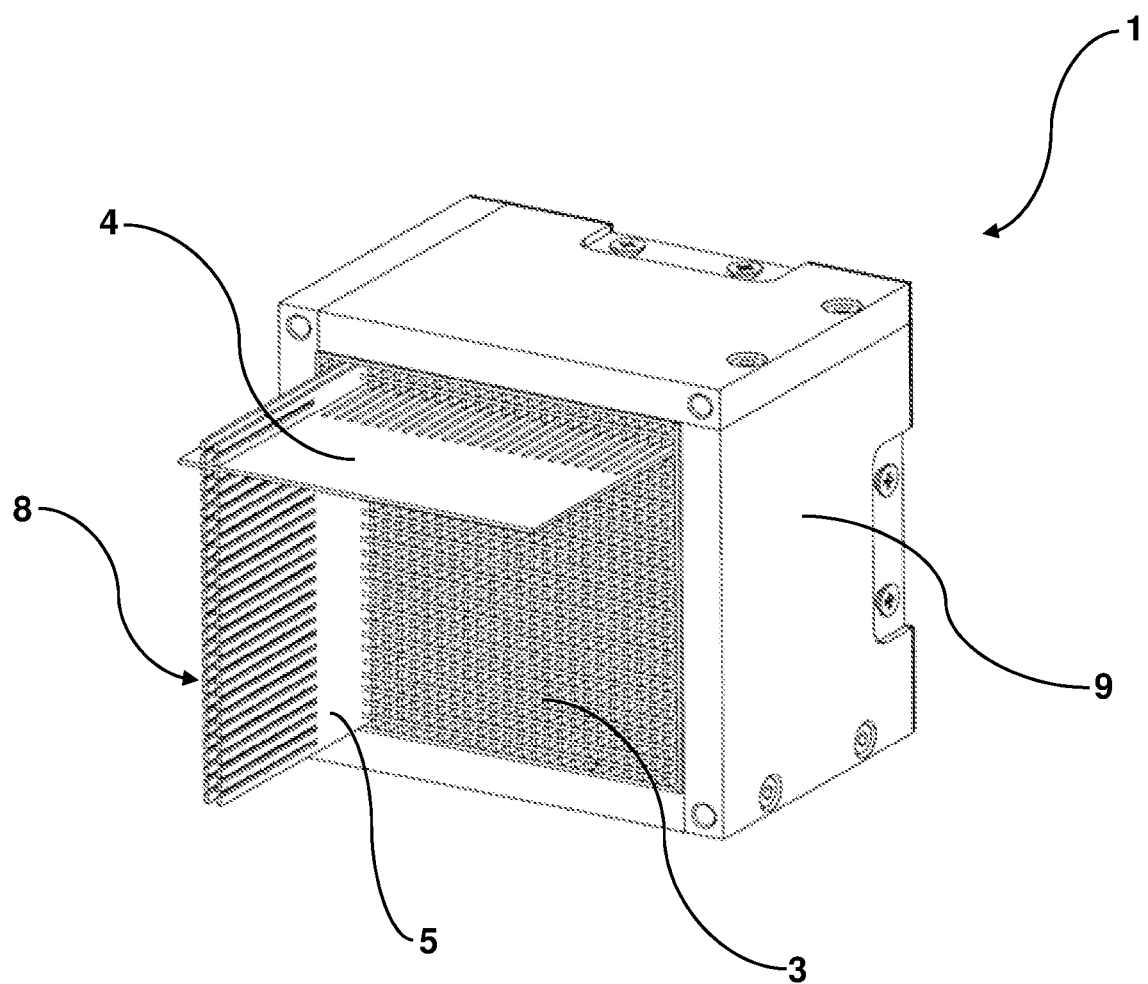
FIG. 1 shows perspective view of the calorimetric detector with its first assembly of parallel tungsten plates and a second assembly of parallel tungsten plates, wherein the first assembly is perpendicular to the second assembly.
Figure 2:
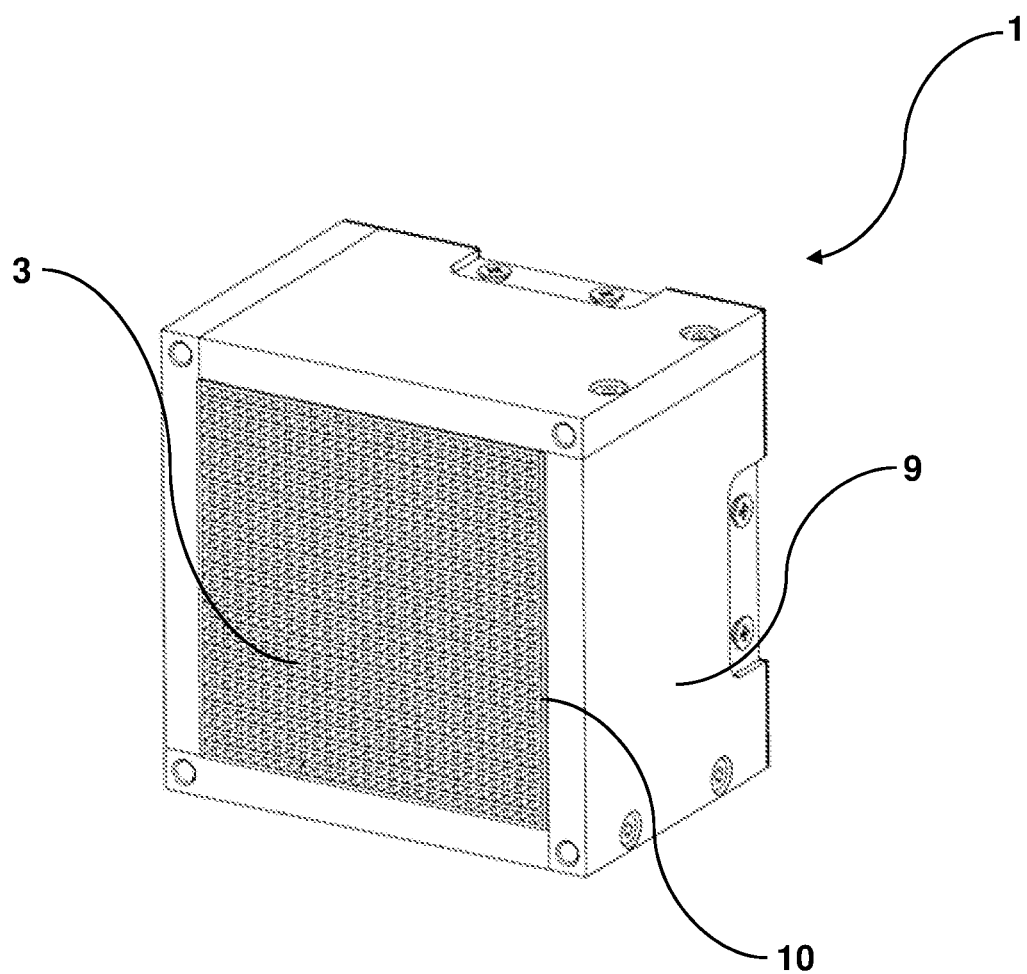
FIG. 2 shows perspective view of the calorimetric detector with stacked tungsten matrix in the protective metal frame.
Figure 3:
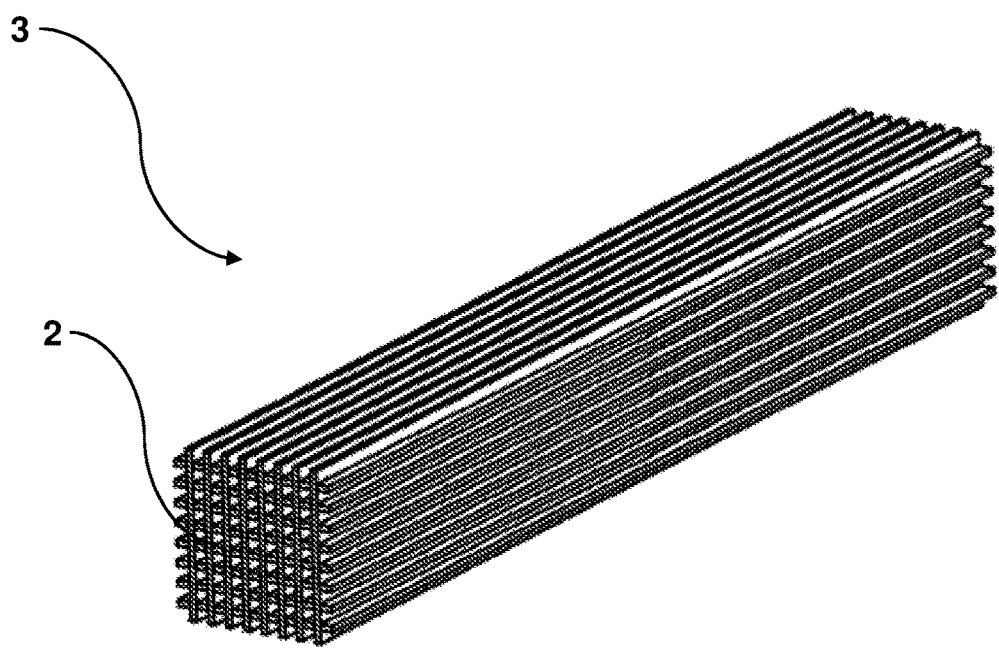
FIG. 3 shows perspective detailed view of the tungsten matrix with stacked tungsten plates of the first assembly and of the second assembly.
Figure 4:
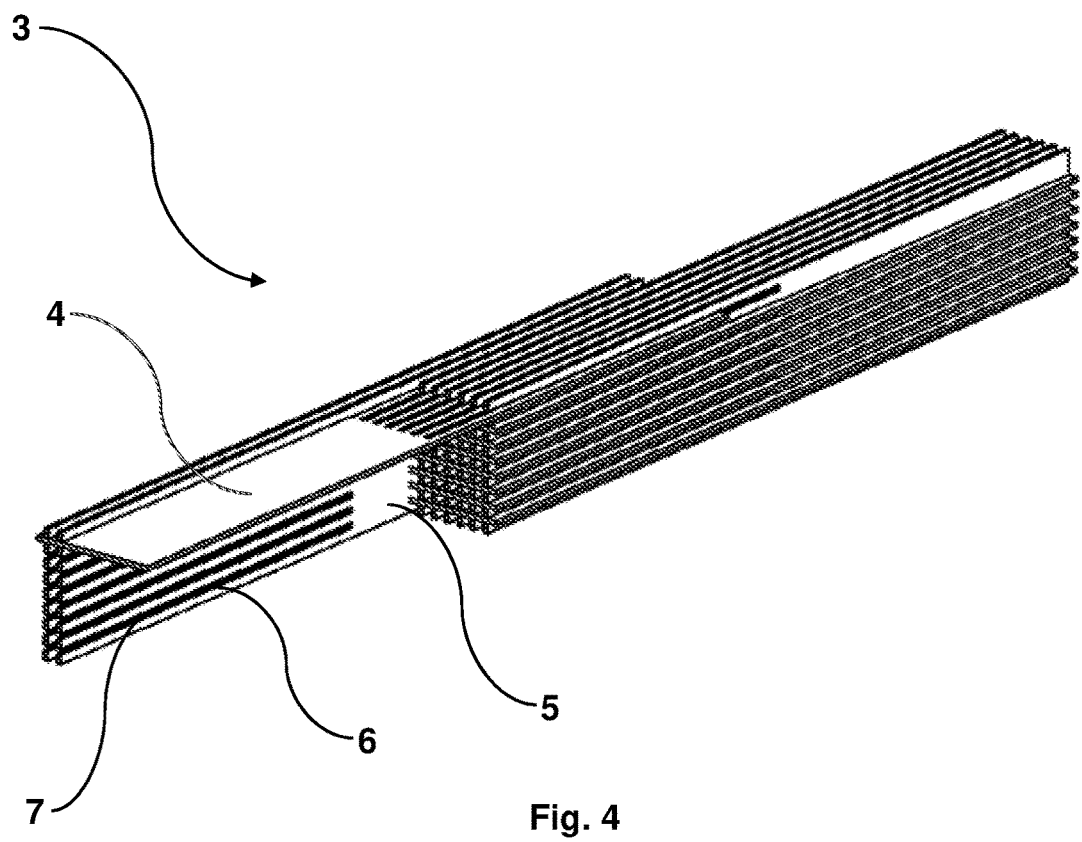
FIG. 4 shows perspective detailed view of the tungsten matrix with unassembled parallel tungsten plates of the first assembly and of the second assembly.
Figure 5:
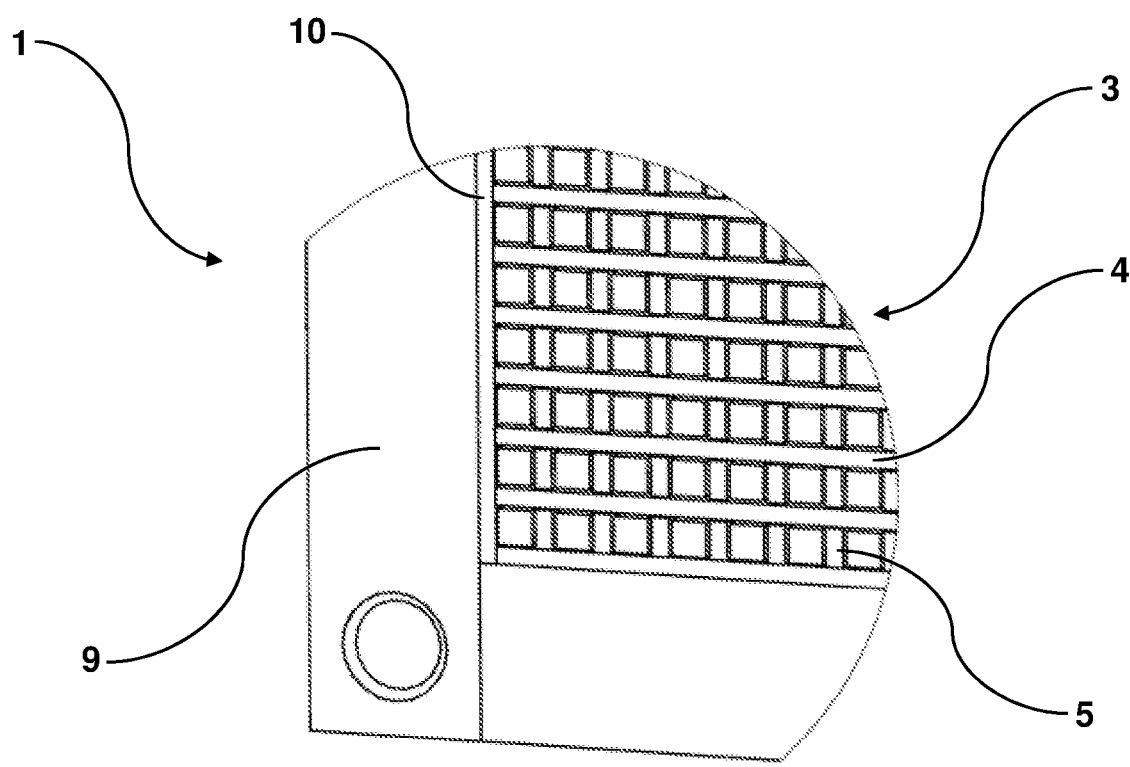
FIG. 5 shows detailed view of the grid of the stacked tungsten plates of the first assembly and of the second assembly in the tungsten matrix.
Figure 6:
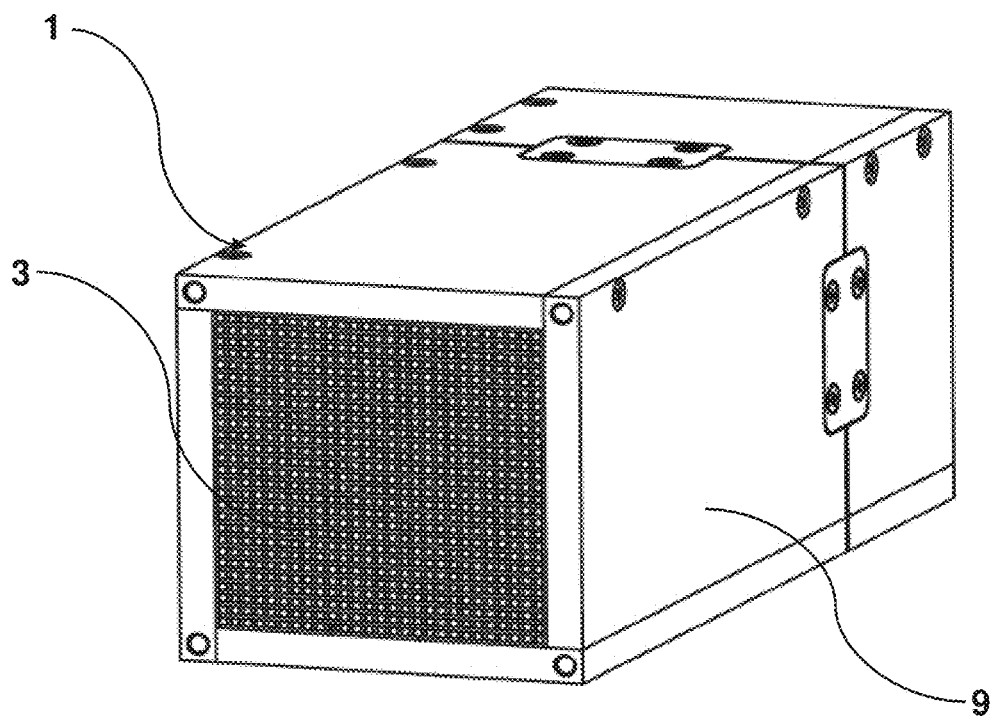
FIG. 6 shows perspective view of the calorimetric detector.
Figure 7:
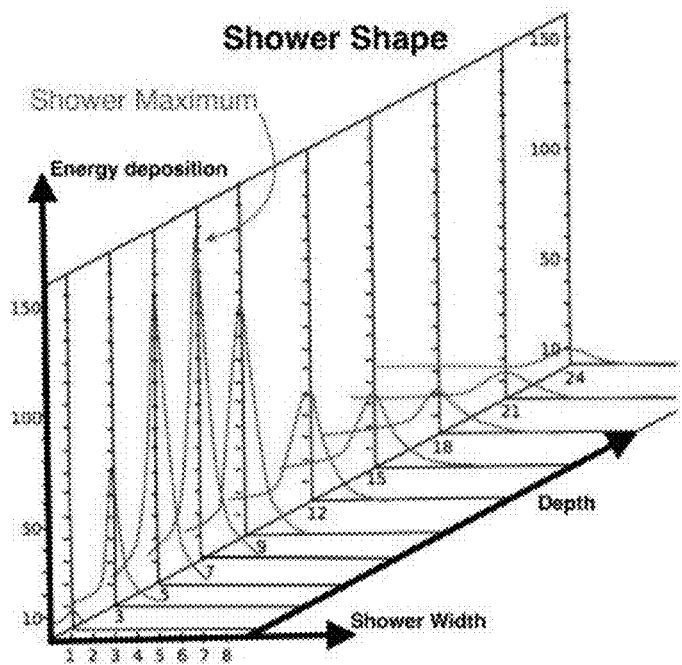
FIG. 7 shows graph of the shower shape.

The shower shape is shown in the graph of FIG. 7.

The electromagnetic showers, e.g., their longitudinal and lateral sizes are described in terms of the radiation length $X_0$, which depends on the characteristics of the material:

$$X_0\left(\frac{g}{cm^2}\right) \cong \frac{716 \text{ gcm}^{-2} A}{Z(Z+1)\ln\left(\frac{287}{\sqrt{Z}}\right)},$$

where Z and A are the atomic number and weight of the material, respectively.

The calorimetric detector 1 according to this invention defined the cells of the calorimetric detector 1 function of the type of particle, for example an electron shower of few GeV had a depth of 1.5 cm, so a tungsten matrix 3 which had a precise size was constructed, and the energy without any lateral leakage was collected.

The tungsten matrix 3 was based on a construction of a first assembly 4 of parallel tungsten plates and a second assembly 5 of parallel tungsten plates. The first assembly 4 was perpendicular to the second assembly 5 and formed with it a grid such that each plate was in one half formed by alternating teeth 6 and gaps 7. The plates of the first assembly 4 fitted detachably with their teeth 6 into the gaps 7 of the second assembly 5 and vice versa. The tungsten matrix 3 was arranged in a protective metal frame 9 having tungsten inner walls 10 forming a tungsten matrix 3 shell. The protective metal frame 9 was made of stainless steel, which also served to attach other parts to the detector faces like a face cover with a reflector or a readout electronics.

The spaces between the plates of the first assembly 4 and the second assembly 5 formed longitudinal sections 8 of the tungsten matrix 3. The inner cross-section of the longitudinal sections 8 had a size of one pixel and the size of the tungsten matrix 3 was 9×9 pixels. In another not shown embodiment the size of the tungsten matrix 3 was 18×18 pixels, 27×27 pixels or 36×36 pixels.

The scintillating fibers 2 were arranged longitudinally, further the scintillating fibers 2 were made of a single crystal material—YAG:Ce. In another not shown embodiment the scintillating fibers 2 were made of a single crystal material selected from the group: GGAG:Ce or LYSO:Ce.

The calorimetric detector 1 was created in different configurations, with different numbers of pixels. The number of pixels also determined the number of longitudinal sections 8. The number of longitudinal sections 8 was one less than the number of pixels in any axis. By stacking the longitudinal sections 8, a grid separating the individual pixels was created. To surround all pixels with the same thickness of tungsten, it was necessary to place tungsten inner walls 10 around the entire calorimetric detector 1, which were dimensioned by the sum of the first assembly 4 of parallel tungsten plates and the second assembly 5 of parallel tungsten plates and all pixels.

Example of calculation of external dimensions of the first assembly 4 of parallel tungsten plates and the second assembly 5 of parallel tungsten plates for the 9×9 pixels calorimetric detector 1: The calorimetric detector 1 dimensions were 1×1×100 mm. The plates of the first assembly 4 and the second assembly 5 were 0.5 mm thick with the length of the calorimetric detector 1, 100 mm. The tungsten plate width was the number of pixels multiplied by the calorimetric detector 1 size, plus the number of pixels minus one, all multiplied by the tungsten plate thickness. The following width was calculated for 9×9 pixels calorimetric detector 1.

Tungsten plate width: (9×1)+((9−1)×0.5)=13 mm

The plates of the first assembly 4 and the second assembly 5 were made of pickled, hot rolled tungsten sheet with a thickness of 0.5 mm (+/−0.110 mm). The final shape of the individual plates of the first assembly 4 and the second assembly 5 were produced by CNC electro-erosion machining. The plates of the first assembly 4 and the second assembly 5 were then intensively cleaned in various mixtures to remove impurities and residual metals after processing.

Each plate of the first assembly 4 and the second assembly 5 fitted perpendicularly to each other thanks to teeth 6 and gaps 7 formed in each plate was in one half of its length. By assembling all the plates of the first assembly 4 and the second assembly 5 into each other, it created a grid formed purely by tungsten. There was not used any other material for the connection between.

The grid produced in this way was encapsulated on the sides of the tungsten matrix 3 by a tungsten inner wall 10 forming a tungsten matrix 3 shell of the same thickness as the plates of the first assembly 4 and the second assembly 5, which guaranteed that each individual pixel from the tungsten matrix 3 was surrounded by the tungsten matrix 3 shell.

All segments of the calorimetric detector 1 were the same shape. The plates of the first assembly 4 and the second assembly 5 of the unique shape were easily assembled into each other to create regular grid. This shape ensured the cohesion of the grid without a need for additional connecting material. The plates of the first assembly 4 and the second assembly 5 were connected so tightly, that there was a minimal gap between each other. Therefore, the highest possible density of shielding around the calorimetric detector 1 was achieved using pure tungsten. The calorimetric detector 1 made only of tungsten and scintillation fibers 2 was fragile and so it was necessary to insert it into a protective metal frame 9 which ensured sufficient strength and cohesion of all parts. This protective metal frame 9 was also used for mounting the calorimetric detector 1, as mounting threaded holes in the corners.

INDUSTRIAL APPLICABILITY

The calorimetric detector for measuring the energy of electrons and photons according to the present invention can be used mainly in nuclear or high energy physics, namely in calorimetry for measuring energy deposition.

LIST OF RELATED MARKS 1 calorimetric detector
2 scintillating fiber
3 tungsten matrix
4 first assembly
5 second assembly
6 tooth
7 gap
8 longitudinal section
9 protective metal frame
10 tungsten inner wall

What is claimed is:

1. A calorimetric detector (1) for measuring the energy of electrons and photons comprising a light energy absorber and scintillating fibers (2), wherein the absorber is formed of a tungsten matrix (3), comprising a first assembly (4) of parallel tungsten plates and a second assembly (5) of parallel tungsten plates, wherein the first assembly (4) is perpendicular to the second assembly (5) and forms with it a grid such that each plate is in one half formed by alternating teeth (6) and gaps (7), wherein the plates of the first assembly (4) fit detachably with their teeth (6) into the gaps (7) of the second assembly (5) and vice versa, so that the spaces between the plates of the first assembly (4) and the second assembly (5) form longitudinal sections (8) of the tungsten matrix (3), wherein the inner cross-section of the longitudinal sections (8) has a size of one pixel in which the scintillating fibers (2) are arranged longitudinally, further that the scintillating fibers (2) are made of a single crystal material selected from the group: YAG:Ce or GGAG:Ce or LYSO:Ce, and that the tungsten matrix (3) is arranged in a protective metal frame (9) having tungsten inner walls (10) forming a tungsten matrix (3) shell.

2. The calorimetric detector (1) according to claim 1, wherein the protective metal frame (9) and the tungsten matrix (3) are in prismatic shape.

3. The calorimetric detector (1) according to claim 1, wherein the longitudinal sections (8) adjacent to the inner side of the tungsten matrix (3) shell also have an inner cross-section of one pixel.

4. The calorimetric detector (1) according to claim 1, wherein the plates of the first assembly (4) and the second assembly (5) are made of pickled tungsten sheet.

5. The calorimetric detector (1) according to claim 4, wherein the plates of the first assembly (4) and the second assembly (5) have a thickness in the range of 0.39 to 0.61 mm.

6. The calorimetric detector (1) according to claim 1, wherein the protective metal frame (9) is made of stainless steel.

7. The calorimetric detector (1) according to claim 1, wherein the protective metal frame (9) is further provided with a face cover, a reflector, a readout electronics and/or a combination thereof.

8. The calorimetric detector (1) according to claim 1, wherein the tungsten matrix (3) has a size of at least 9×9 pixels.

9. The calorimetric detector (1) according to claim 1, wherein its length is equal to the length of the first assembly (4) of parallel tungsten plates and the second assembly (5) of parallel tungsten plates.

* * * * *